United States Patent [19]

Elias

[11] Patent Number: 4,518,069

[45] Date of Patent: May 21, 1985

[54] ADJUSTABLE SPEED DRIVE UTILIZING RADIALLY MOVABLE HOLLOW PISTONS WHICH ACT ON A CAM SURFACE

[76] Inventor: Charles R. Elias, 19306 Scenic Harbour, Northville, Mich. 48167

[21] Appl. No.: 438,058

[22] Filed: Nov. 1, 1982

[51] Int. Cl.³ .................. F16D 31/02; F04B 13/06
[52] U.S. Cl. ..................... 192/60; 417/488; 417/491; 188/295
[58] Field of Search .......... 192/60; 188/295, 294, 188/293; 417/491, 488

[56] References Cited

U.S. PATENT DOCUMENTS

| 1,105,792 | 8/1914 | Jessen | 192/60 |
|---|---|---|---|
| 1,436,753 | 11/1922 | Carpenter | 192/60 |
| 1,567,912 | 12/1925 | Carey | 192/60 |
| 1,840,161 | 1/1932 | Graser | 192/60 |
| 1,923,115 | 8/1933 | Rash et al. | 188/295 X |
| 1,943,637 | 1/1934 | Sturm | |
| 2,052,429 | 8/1936 | Tyler | 188/293 X |
| 2,204,261 | 6/1940 | Fraser | 192/60 |
| 2,386,459 | 10/1945 | Hautzenroeder | 192/60 |
| 2,595,479 | 5/1952 | Nelson | 192/60 |
| 2,870,747 | 1/1959 | Gurries | |
| 3,120,154 | 2/1964 | Gilreath | 91/135 |
| 3,150,751 | 9/1964 | Peone | 188/295 X |
| 4,195,095 | 3/1980 | Heyl | 91/488 X |
| 4,242,068 | 12/1980 | Shaw | 418/269 |
| 4,373,428 | 2/1983 | Fricke | 91/488 X |
| 4,469,012 | 9/1984 | Bigo et al. | 91/491 |

FOREIGN PATENT DOCUMENTS

2551826  5/1977  Fed. Rep. of Germany ........ 91/491

Primary Examiner—Rodney H. Bonck
Assistant Examiner—David D. House
Attorney, Agent, or Firm—Harpman & Harpman

[57] ABSTRACT

An adjustable hydraulic speed drive for controllably maintaining output torque and variable output speed is disclosed. The drive utilizes a rotating group of pistons in radially arranged bores in a portion of an input shaft. A supply of controlled fluid is provided to the bores by way of passageways in an output shaft communicating with said bores. A portion of the output shaft supports a cam ring in spaced relation to said bores and roller ends on said pistons engage said cam ring by centrifugal force upon rotation of the input shaft so that the pistons move responsive to the cam ring contours, said impart movement to the cam ring and output shaft by controlling the pressure level and/or flow rate of the fluid exiting from said bores.

6 Claims, 2 Drawing Figures

ADJUSTABLE SPEED DRIVE UTILIZING RADIALLY MOVABLE HOLLOW PISTONS WHICH ACT ON A CAM SURFACE

BACKGROUND OF THE INVENTION (1) Field of the Invention:

This invention relates to fluid powered pumps and motors and adjustable speed drives and piston powered drives of the type utilized in industry for speed drive applications.

(2) Description of the Prior Art:

Prior art devices of this type have relied on a number of different design drives with a plurality of radially positioned hydraulic pistons. See for example U.S. Pat. Nos. 1,943,637, 2,870,747, 3,120,154 and 4,242,068.

In U.S. Pat. No. 1,943,637, a high pressure rotary engine is disclosed having a piston drum with multiple pistons extending therefrom, the ends of which are slidably engaged in guides in an annular groove within the inner surface of a casing.

U.S. Pat. No. 2,870,747 shows a hydraulic motor having a rotor with radially positioned spring loaded rollers that engage a track and are moved relative thereto by fluid pressure.

U.S. Pat. No. 3,120,154 discloses a hydraulic motor having a rotor with radially positioned piston and vane assemblies that are held against the interior of the housing by a shaft. Input of fluid pressure against the vanes rotates the rotor.

Finally, in U.S. Pat. No. 4,242,068, a vane pump is shown wherein a by-pass port in the vane provides a path to the low pressure zone behind the vane during the time the vane is exposed to high pressure.

Applicant's device is an adjustable speed drive having a plurality of radially positioned pistons and roller assemblies that drive a movable cam ring thereby transmitting and controlling power from an input shaft to an output shaft by means of controlling fluid flow and pressure from piston assemblies.

SUMMARY OF THE INVENTION

A hydraulic adjustable drive utilizing one rotating group in a balanced system of reciprocating piston and roller assemblies engaging and driving a cam ring. The piston and roller assemblies impart tangential force to the cam ring by an alternating fluid control and supply to each piston.

DESCRIPTION OF THE PREFERRED EMBODIMENT

Figure 2:
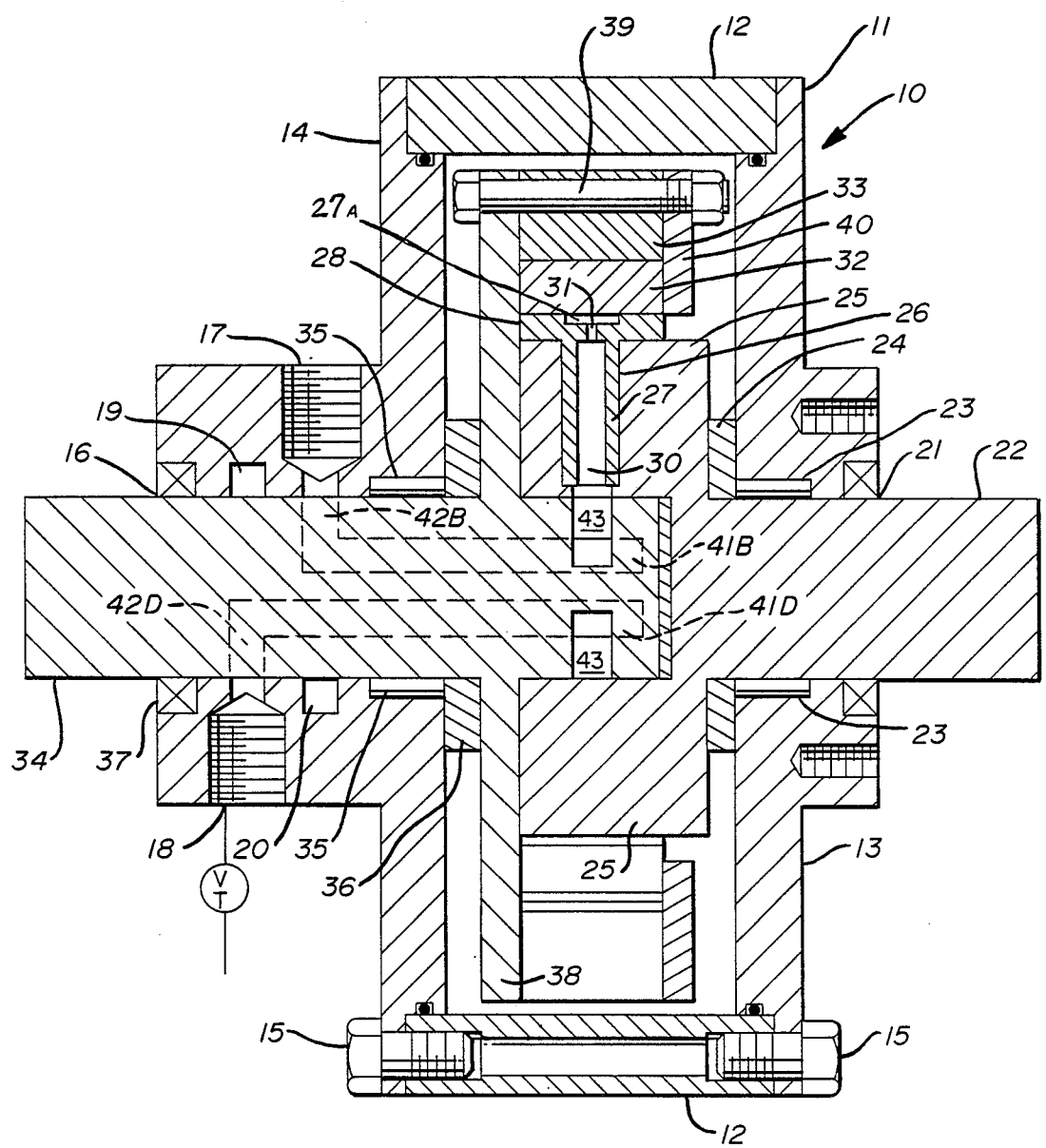
FIG. 2 is a section on lines 2—2 of FIG. 1.

Referring to FIG. 2 of the drawings, an adjustable speed drive 10 can be seen having a housing 11 comprised of an annular body member 12 with an input cover 13 and an output cover 14 secured thereto by a plurality of fasteners 15.

The output cover 14 has a central aperture 16 and a pair of offset oppositely disposed fluid control ports 17 and 18, which are internally threaded. Each of the control ports 17 and 18 communicate with internal annular grooves 19 and 20 in the output cover 14. The input cover 13 has a centrally located aperture 21 which receives an input shaft 22. The input shaft 22 is rotatably supported by bearings 23 which are secured against axial movement by a retainer washer 24 on the input shaft 22. A rotor 25 is integrally formed on one end of the input shaft 22 and has a plurality of bores 26 spaced radially thereabout.

Figure 1:
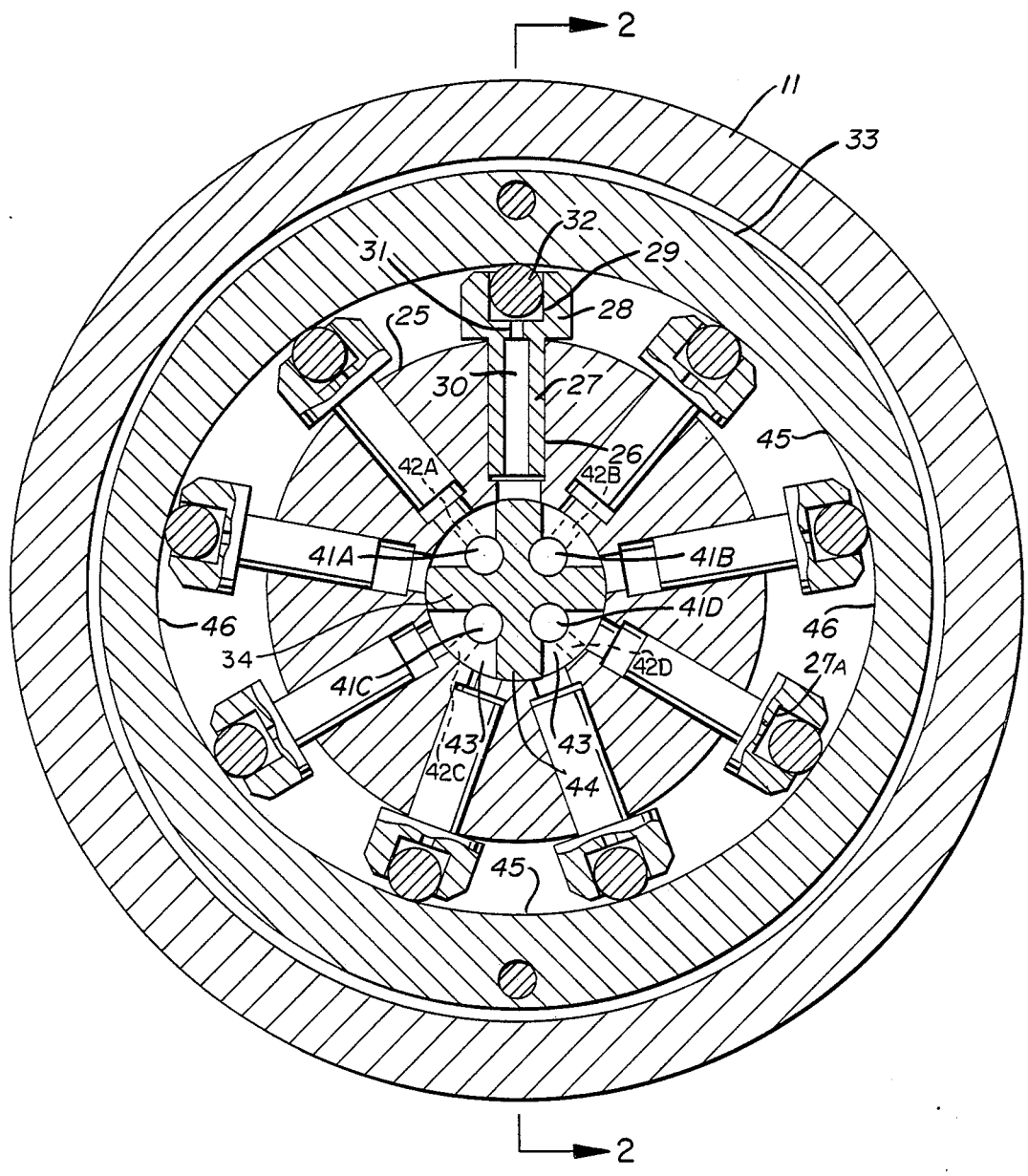
FIG. 1 is a sectional view of the hydraulic adjustable speed drive.

Referring now to FIGS. 1 and 2 of the drawings, it will be seen that each bore 26 has a piston 27 movably positioned therein. Each of the pistons 27 has an enlarged rectangular cross head portion 28 with a transversely extending channel 29 therein. Each of said pistons 27 has a piston bore 30 extending axially through the piston 27 with an area of decreased diameter 31 adjacent the rectangular cross head portion 28. The cross head portion 28 of said piston 27 has a pocket 27A formed by a bore axially through said head. The pocket 27A therefore communicates with the bore 30 through the area of decreased diameter 31. A roller 32 of a diameter greater than the depth of the groove 29 is positioned therein so that a portion of the roller extends above the piston 27. The plurality of pistons 27 with the rollers 32 extend radially from the rotor 25 engaging a cam ring 33, the inner surface of which is smooth and defines a cam configuration.

An output shaft 34 is rotatably positioned through the aperture 16 in the output cover 14 supported by bearings 35 which are restricted from axial movement by a washer 36. A seal 37 prevents fluid from leaking along the output shaft. The output shaft 34 registers in axial alignment in a bore in the rotor 25. An annular flange 38 is integrally formed on the output shaft with circumferentially spaced apertures adjacent its outer edge. Shoulder bolts 39 extend through said apertures and corresponding openings in the cam ring 33 locking the output shaft to the cam ring 33. A retainer ring 40 fastened to the cam ring by the shoulder bolts restricts axial movement of the rollers 32.

The output shaft 34 has longitudinally extending passageways 41A, 41B, 41C and 41D that communicate at one end with an equal number of radially positioned holes 42A, 42B, 42C, and 42D in the output shaft. The longitudinal passageways 41B and 41C connect through holes 42B and 42C with the fluid control port 17. The other longitudinally extending passageways 41A, 41D, and holes 42A and 42D, connect with the other fluid control port 18.

Four transverse grooves 43 are formed in the output shaft 34 adjacent the inner end thereof and individually communicate with the longitudinally extending passageways 41A, 41B, 41C and 41D, respectively. The grooves 43 communicate with the bores 26 in an alternating sequence as the rotor 25 turns. The grooves 43 define lands 44 therebetween, which as the rotor 25 turns, alternately exposes the bores 26 to each of the grooves 43 and their respective control ports 17 and 18.

In operation, the control ports 17 and 18 are connected to a supply of fluid and to a pressure flow control valve VT respectively such as known in the art, as VICKERS FCG-02-1500-50.

As the input shaft rotates, the pistons 27 move outwardly with the rollers 32 engaging the cam ring 33. The pistons 27 and rollers 32 follow the cam surface which has two high points 45 and two low points 46 on its inner surface moving the pistons inwardly and outwardly respectively.

An open system with no restriction of the fluid pressure flow control will allow the pistons and rollers to freely follow the cam ring 33 moving oppositely disposed groups of pistons 27 inwardly and outwardly respectively with no movement of the output shaft 34. Activation of the fluid flow control restricts the flow of fluid through the passageways 41B and 41C restricting the flow of fluid from the bores 26 as the pistons 27 move inward until a predetermined pressure is reached. The restricted flow of fluid forces the pistons 27 against the cam ring 33 imparting a tangential force to the cam ring 33. The fluid flow to each bore 26 alternates as the bores alternately pass over the grooves 43 which communicate with the passageways 41A, 41B and 41C and 41D and their respective inlet and outlet ports 17 and 18. At any given point of rotation a number of pistons 27 are moved outwardly with no flow restriction or moved inwardly under a restricted flow in a balanced system.

As the fluid pressure increases within the passageways 41, a proportional increase in fluid pressure is imparted to the rollers 32 through the piston bores 30 and the pockets 27A acting as hydrostatic bearings supporting the rollers 32.

It will thus be seen that a hydraulic adjustable speed drive of simple construction has been disclosed which is highly efficient and capable of improved performance both at high speed and low speed. It is quiet in operation and is smaller than comparable devices heretofore known. The drive incorporates a unique design of supporting the radially movable pistons and their hydraulic loads which makes possible higher pressure capabilities and higher reliability. The device is capable of controlling both the torque output and the speed output. For example, in controlling torque output, the device is controlled by a fluid pressure control, such as the valve VT connected to the outlet port 18 and set to allow no outward flow of the fluid pressure until the same reaches a preset level. Rotation of the input shaft 22 causes the pistons 27 to reciprocate in their bores 26 as previously described and thereby pump fluid toward the outlet port 18. Since fluid flow is restricted by the pressure control, pressure will rise in the bores 26 and in the hollow pistons 27 urging the same radially outwardly and thus creating a radial force on the cam ring 33. The eliptical shape of the cam ring 33 translates the radial force to a tangential reaction force on the cam ring thus creating a controlled torque on the output shaft 34.

It will thus be seen that the torque on the output shaft will rise to a level corresponding to the pressure setting of the fluid pressure control valve VT controlling the output port 18.

The output shaft 34 will begin rotating if said torque is greater than a machine torque load thereon. If said torque is less than the machine torque load, the output shaft 34 will not rotate, but will transmit said torque to the machine. If the machine torque load is less than said torque, the output shaft 34 will accelerate to a speed approximately equal to the speed of the input shaft 22 and it will be observed that the output shaft 34 will turn at input shaft 22 speed as long as torque requirements are less than the amount of torque corresponding to the pressure setting of the fluid pressure control. If output torque requirements rise above the output torque capabilities of the adjustable hydraulic speed drive at the control pressure set, output shaft 34 will slow down until the machine load matches the maximum said output torque of the hydraulic speed drive or the rotation of the output shaft 34 stops. Fluid flow at such time would pass through the fluid pressure control valve VT back to the supply reservoir at a rate proportional to the input speed minus the output speed and physical displacement or size of the unit.

It will occur to those skilled in the art that the adjustable hydraulic speed drive operates so that torque input to the drive is always equal to the torque output; the only torque losses which occur being at the bearings 23 and 35, which are only lightly loaded due to the arrangement of the input shaft 22 and output shaft 34 being subjected to only a small unbalanced force caused by the hydraulic loads since the design is hydraulically balanced by opposing pistons 27.

In controlling the speed output from the adjustable hydraulic speed drive, a flow control mechanism is arranged to control the outlet port 18 by setting the amount of fluid that will be permitted to pass through the flow control mechanism, the hydraulic speed drive will adjust to this permitted flow rate by turning the output shaft 34 so that the input speed minus the output speed times the displacement of the unit per revolution of the input is equal to the flow setting of said flow control. When the difference between the input speed and the output speed is in excess of what is desired, excess fluid will attempt to pass through the flow control. The flow control will reduce its opening automatically and pressure will rise increasing the torque on the output shaft 34 causing it to accelerate which will thereby reduce the speed difference between input and output thereby reducing the flow rate to a level set by the flow control valve. The adjustable hydraulic speed drive will therefore adjust its output speed to correspond to the level set and it will be observed that conversely if the flow rate through the flow control valve is too low, the reverse occurs, the flow control valve opening and reducing its restriction whereupon the pressure drops and torque on the output shaft 34 will decrease and the output shaft 34 will slow down which causes more fluid to be pumped through the flow control valve so as to agree with the desired rate.

It will further be obvious that when the adjustable hydraulic speed drive is operating at high speed, no relative motion occurs between the parts thereof and this reduces the sound level and increases reliability of the hydraulic speed drive. Since the torque loss of the adjustable hydraulic speed drive is very low, only a slight speed loss will occur at high speed indicating overall high efficiency. It will also be apparent that only one rotating group is employed to achieve variable speed, while other hydrostatic drives using a pump and a motor have size, weight and cost disadvantages.

Having thus described my invention what I claim is:

1. An improvement in an adjustable speed drive having a housing; an input rotor, an output rotor, cam surfaces on said output rotor; a plurality of bores formed in the input rotor and hollow pistons in said bores; said bores, pistons and cam surfaces arranged in radial relationship in said housing; a drive shaft on said input rotor; a driven shaft on said output rotor, said shafts having a common axis; the improvement comprising first passageways in said input rotor communicating with said bores; secondary passageways in said output rotor arranged for selective communication with said first passageways, annular chambers and communicating inlet and outlet ports in said housing, a source of fluid pressure in communication with said secondary passageways by way of said annular chambers and communicating inlet and outlet ports and valve means controlling said fluid pressure whereby said controlled fluid pressure moves said pistons radially with respect to said cam surfaces and said controlled fluid pressure selectively holds said pistons in desired position relative to said cam surfaces so as to impart controlled motion to said output rotor.

2. The improvement in an adjustable speed drive set forth in claim 9 and wherein a portion of said output rotor is journaled in a socket in said input rotor transverse lands on said portion of said output rotor arranged to separate transverse grooves in said output rotor between said lands, said transverse grooves being in communication with said secondary passageways.

3. The improvement in an adjustable speed drive set forth in claim 2 wherein said portion of said output rotor, the socket in said input rotor and the lands and grooves are on a common radial plane through said drive.

4. The improvement in an adjustable speed drive set forth in claim 9 and wherein the drive shaft extends outwardly axially of said input rotor and the driven shaft extends outwardly axially of said output rotor and oppositely of said drive shaft.

5. The improvement in an adjustable speed drive set forth in claim 1 and wherein said valve means controlling said fluid pressure comprises a pressure flow control valve.

6. In an adjustable speed drive having an input rotor; an output rotor; cam surfaces on one of said rotors; a plurality of bores formed in the other rotor; said bores and cam surfaces arranged in opposed radial relationship; the improvement comprising hollow pistons in said bores; cross heads on said pistons, channels in said cross heads; openings in said channels communicating with said bores, rollers journaled in said channels in said cross heads on said pistons, first passageways in one of said rotors communicating with said bores; secondary passageways in the other rotor arranged for communication with said first passageways, a source of fluid pressure in communication with said secondary passageways and pressure flow valve means controlling said fluid pressure whereby upon rotation of one of said rotors, fluid pressure from said source moves said pistons and said rollers separately, radially against said cam surfaces and said controlled fluid pressure holds said pistons and rollers in desired position relative to said cam surfaces so as to impart controlled motion to said other rotor, said fluid pressure spacing said rollers with respect to said pistons so as to reduce friction therebetween.

* * * * *